United States Patent
Fontana

[11] Patent Number: 5,899,689
[45] Date of Patent: May 4, 1999

[54] FURNACE FOR PROCESSES AND TREATMENTS IN A SUB-STOICHIOMETRIC ATMOSPHERE

[75] Inventor: Piergiorgio Fontana, Genoa, Italy

[73] Assignee: Demag Italimpianti S.p.A., Genoa, Italy

[21] Appl. No.: 08/942,718

[22] Filed: Oct. 2, 1997

[30] Foreign Application Priority Data

Oct. 11, 1996 [IT] Italy ................................. GE96A0090

[51] Int. Cl.$^6$ ................................................. F27D 17/00
[52] U.S. Cl. ............................ 432/180; 432/179; 432/176
[58] Field of Search ........................... 432/179, 180, 432/181, 197, 215, 217, 124, 137, 138, 141, 142, 143, 144, 145, 146, 147, 149, 150, 152, 153, 165, 172, 176, 188

[56] References Cited

U.S. PATENT DOCUMENTS

| | | | |
|---|---|---|---|
| 3,726,515 | 4/1973 | Knaak | 432/176 |
| 4,125,364 | 11/1978 | Stephens | 432/149 |
| 4,358,268 | 11/1982 | Neville | 432/180 |
| 4,482,314 | 11/1984 | Giese et al. | 432/137 |
| 4,528,012 | 7/1985 | Sturgill | 432/180 |
| 5,057,010 | 10/1991 | Tsai | 432/179 |
| 5,145,363 | 9/1992 | Nielsen et al. | 432/180 |
| 5,161,968 | 11/1992 | Nutcher et al. | 432/179 |
| 5,164,145 | 11/1992 | Smith | 432/124 |
| 5,203,859 | 4/1993 | Khinkis et al. | 432/180 |
| 5,460,789 | 10/1995 | Wilhelm | 422/173 |
| 5,595,481 | 1/1997 | Miyahara | 432/137 |

FOREIGN PATENT DOCUMENTS 2261059  5/1993  United Kingdom.

*Primary Examiner*—Philip H. Leung
*Assistant Examiner*—Jiping Lu
*Attorney, Agent, or Firm*—Larson & Taylor

[57] ABSTRACT

Furnace for processes and treatments in a sub-stoichiometric atmosphere, includes a combustion chamber (1) provided with a fuel-feeding mechanism, feeding mechanism (3) for combustion promoter and an extraction mechanism (4) for the gases produced in the interior of the chamber (1). The feeding mechanism (3) for combustion promoter and the extraction mechanism (4) for the gases are connected, in an alternating way with suitable selection mechanisms (203, 213, 104, 114), to the furnace through at least one device (2) connected by a suitable mechanism (402) to an open port (121) on the combustion chamber (1) of the furnace. The device achieves post-combustion (102) of the gases, heat exchange and heat storage (112).

13 Claims, 2 Drawing Sheets

FURNACE FOR PROCESSES AND TREATMENTS IN A SUB-STOICHIOMETRIC ATMOSPHERE

TECHNICAL FIELD OF THE INVENTION

The present invention relates to furnaces for thermodynamic processes and heat treatments, in particular in a sub-stoichiometric atmosphere.

BACKGROUND OF THE INVENTION

In numerous thermodynamic processes and heat treatments, such as, for example, furnaces for the reduction of metal oxides or for the annealing of rolled steel sections, operating conditions are used which require an atmosphere produced by the incomplete combustion of the fuel present or introduced into the furnace itself. This type of operation has a certain number of disadvantages.

Above all, it is necessary, on the one hand, to pass said fumes to a post-combustion device in order to avoid a discharge of seriously polluting unburned gases to the atmosphere and, on the other hand, the significant calorific value of the fumes themselves is not directly exploited for the process. The recovery of said heat by preheating the combustion air by means of an air/fumes exchanger is as a rule modest because of the limitation of the maximum working temperature of the metal materials used for said exchangers, which as a rule does not allow air-preheating temperatures higher than 500–600° C. In addition, both the discharge conduits for the fumes and those for providing the air carry gas streams at a high temperature, which therefore necessitate extensive insulation.

SUMMARY OF THE INVENTION

It is the object of the present invention to provide a furnace of the type described above, which allows high heat recovery, eliminating the major part of the unburned components of the discharged gases and effecting the transfer of both the discharged gas and the air feed of the furnace through lines at significantly lower temperature.

The subject of the present invention is therefore a furnace for thermodynamic processes and heat treatments, in particular in a sub-stoichiometric atmosphere, comprising a combustion chamber provided with fuel-feeding means, feeding means for combustion promoter and extraction means for the gases produced in the interior of said chamber, characterized in that said feeding means for combustion promoter and said gas extraction means are connected, in an alternating way with suitable selection means, to said furnace through at least one device connected by suitable means to an open port on the combustion chamber of said furnace, said device comprising means for post-combustion of the gases, heat exchange and heat storage.

In one embodiment, said means for post-combustion and heat exchange comprise a chamber communicating at one end with said selection means, provided with suitable packing disposed in proximity of the end of said chamber communicating with said selection means. Advantageously, said chamber communicates at the opposite end with a conduit connected to said feeding means for combustion promoter, provided with a control means. The said chamber, with the respective conduits for injecting the gases and the combustion promoter into it, is sized such that it favours the complete combustion of the unburned components of the gases.

BRIEF DESCRIPTION OF THE DRAWINGS

Further advantages and features will be evident from the following detailed description of an embodiment of the present invention, for the purpose of example and without limitation, with reference to the attached drawings, in which.

DESCRIPTION OF THE PREFERRED EMBODIMENT

Figure 1:
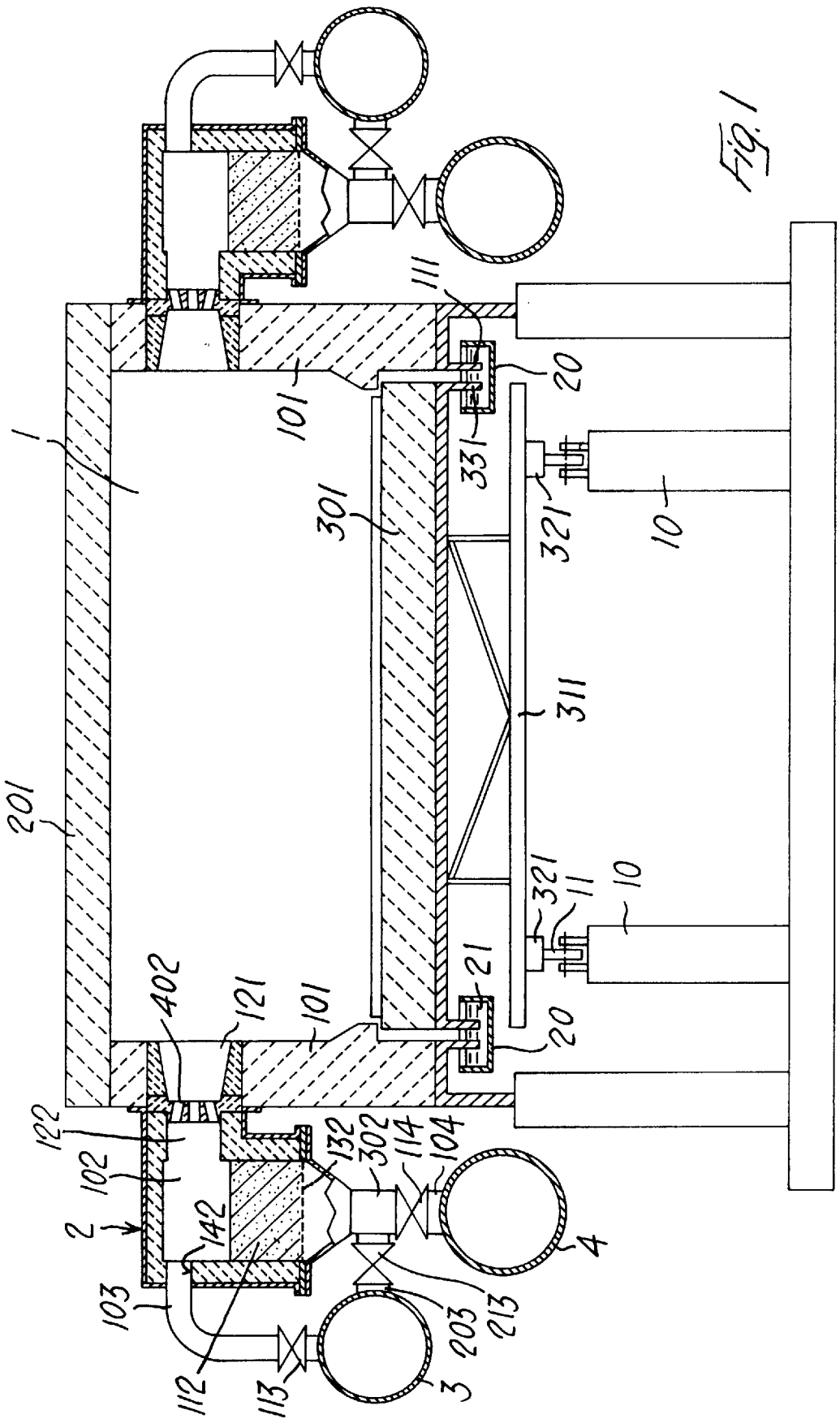
FIG. 1 shows a transverse sectional view of a furnace according to the present invention.

In FIG. 1 a furnace according to the present invention is illustrated; in the figure, a rotary hearth furnace is illustrated by way of example. The combustion chamber of said furnace is designated 1. This chamber is delimited by two side walls 101, one top wall 201 and one hearth 301 which is mobile relative to the said side walls 101 and the top wall 201. Said hearth is mounted in a manner known per se on a frame 311 which slides with the guides 321 on the wheels 11 mounted on the supports 10. The tightness of the chamber 1 with respect to the gases produced therein is assured for the rotating hearth 301 by the hydraulic seals 20 with liquid 21, in which the flanges 331 of the hearth run and into which the flanges 111 of the sides walls are inserted.

On the side walls 101 of the chamber 1, there are open ports 121, to which the devices 2 comprised within the subject of the invention are connected. Said device comprises a chamber 102 partially packed with packing material 112, retained by a grid 132 disposed on the bottom of said chamber 102. On said chamber, a conduit 122 opens which communicates with said port 121 of the wall 101 through the diffuser 402. Moreover, said chamber has, at the same end where the conduit 122 opens, a free space 142 communicating with the conduit 103 which is connected by a control means such as the modulation valve 113 to the header 3 for feeding the combustion-promoting gases. At the opposite end, the chamber 102 terminates in a conduit 302 to which the conduits 203 and 104 communicating with the headers 3 for feeding the combustion promoter and 4 for extracting the gases produced in the chamber 1 can be connected alternatingly by suitable selection means such as the interlock valves 213 and 114 respectively. In the Figure, the furnace zone illustrated in section has two devices 2 shown disposed on the walls 101 of said combustion chamber 1.

Figure 2:
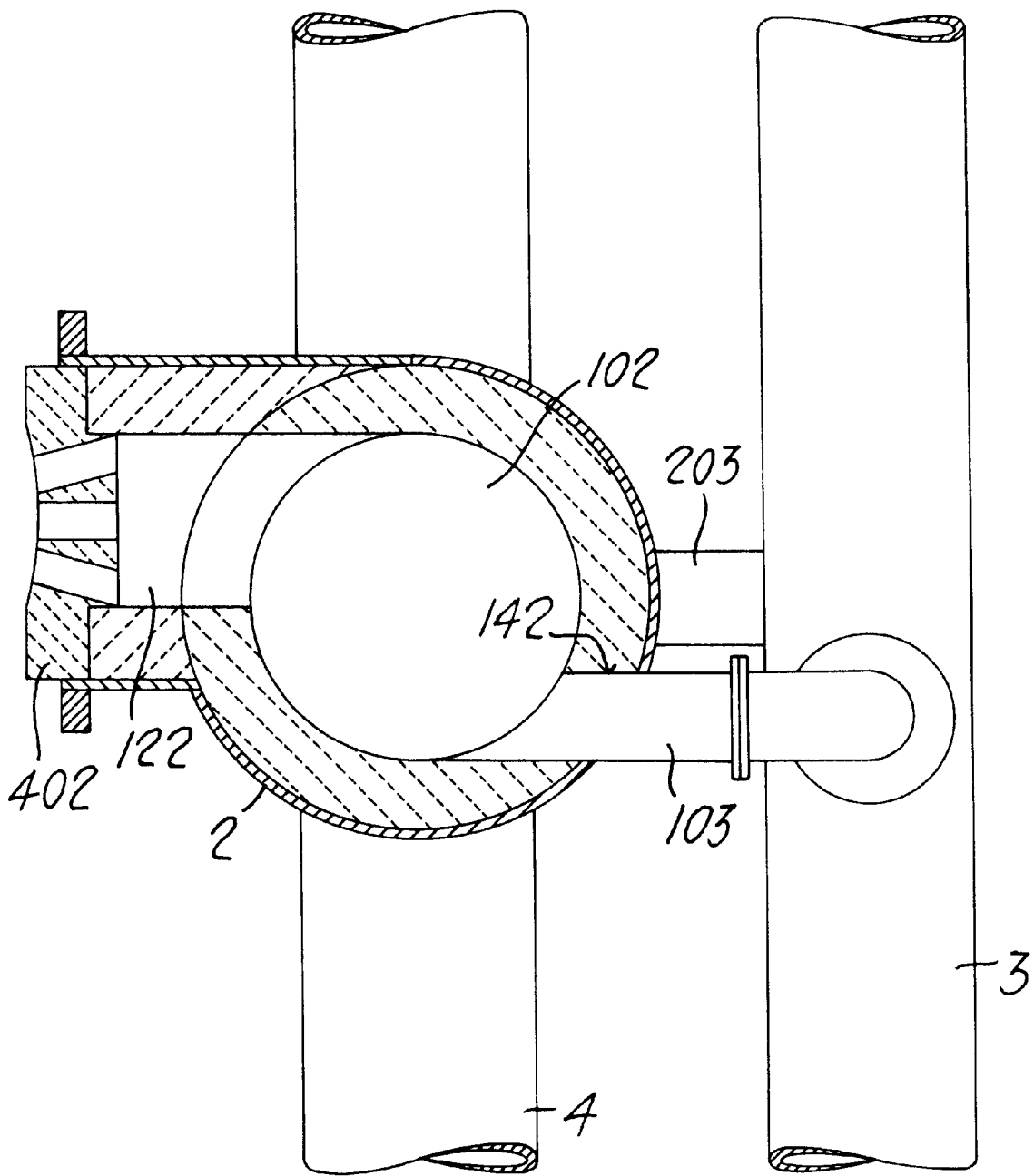
FIG. 2 shows a plan view from above with parts in section of an enlarged detail of the furnace according to the invention.

FIG. 2 illustrates a detail of the furnace, regarding the device 2. The same numerals correspond to the same parts. As can be seen, both the conduit 122 and the conduit 103 are arranged tangentially with respect to the chamber 102 of the said device.

The operation of the furnace according to the invention will become clear from the following. The combustion in the interior of the furnace chamber 1 evolves gas at high temperature (about 1400° C.) and high content of unburned components, in particular CO, in the furnaces for the reduction of metal oxides. The devices 2, with which the furnace of the invention is equipped, operate in alternating phases; in one phase, the valve 114 which controls the conduit 104, which puts the chamber 102 of the device 2 in communication with the extraction header 4, is open, while the valve 213 which controls the conduit 203, which communicates with the header 3 for feeding the combustion promoter is closed. The gas thus flows into the interior of the chamber 102. The quantity of air necessary a) for effecting the complete combustion of the unburned components of the gases coming from the furnace chamber 1 and b) for controlling the temperature of the gas produced at the desired level, for example 1300° C., is injected from the conduit 103 into the chamber 102, modulated owing to the valve 113. The gases, virtually free of unburned residues, then pass through the packing, giving up thereto a large part of their sensible heat, and then enter the header 4 at a temperature of between 200° C. and 300° C. The packing material will conveniently be selected from materials resistant to heat and thermal shock and will be disposed in such a way that it provides an adequate permeability and sufficient surface area per unit volume. The chamber 102, the diffuser 402 and the port 121 will be made with an internal lining of refractory material in order to withstand the heat to which they are exposed.

In the next phase, the valve 114 and the valve 113 are closed and a valve 213 is opened. Consequently, the combustion promoter, that is to say the air destined to feed the furnace, penetrates into the chamber 102 passing through the packing 112 thereof; in this way, the heat stored in the packing 112 is given up to the combustion promoter which, preheated to the intended temperature (generally about 1000° C.), reaches the furnace chamber 1, passing through the diffuser 402 and the port 121. The cycle described above can at this point be repeated again.

Advantageously, the conduit 122 and 103 are disposed in the way illustrated in FIG. 2, in order to allow better mixing of the respective gas flows, that is to say the gas coming from the combustion chamber of the furnace, as regards the conduit 122, and the combustion-promoting gas coming from the header 3 for combustion promoter, as regards the conduit 103.

As is illustrated in the figure for a given furnace zone, the devices 2 are preferably installed in pairs or even numbers, in order to guarantee a constant rate of the gas drawn from a certain zone and of preheated air injected into the latter. The inversion of the operating phase occurs at preset time intervals or when a given temperature threshold is reached, for example a maximum value for the discharge gases or a minimum value for the air injected into the furnace, which expediently is monitored. Advantageously, each furnace zone is controlled as regards the inflow of the combustion promoter and the outflow of the discharge gases by control means disposed on the respective headers.

The furnace thus conceived achieves numerous advantages over furnaces of the known type. In particular, the best results can be achieved where the furnace used operates under conditions of so-called diffuse combustion; in these cases, the physical closeness between the point of injection of the combustion promoter and that of the fuel turns out in fact to be less important.

Finally, the coupling between the post-combustion of the unburned gases extracted from the furnace chamber and the subsequent heat recovery is effected by the technique of alternating-phase regenerative preheaters.

The furnace according to the invention makes it possible to exploit the calorific value of the fumes generated in the combustion chamber with a yield of about 90%, which is very much higher than that obtainable with the devices known in the state of the art. Moreover, the diverse furnace zones become less dependent on each other and substantially more controllable, reducing the disturbing effects which the combustion in a given zone can generate on that which occurs in an adjacent zone and further downstream with respect to the direction of the fumes. Finally, the headers for feeding the combustion promoter and for extracting the fumes can be constructed with smaller dimensions and less insulation or in the absence thereof, since the gases passing through them are at temperatures much lower than those in practice in the devices currently in use.

What I claim is:

1. A furnace thermodynamic processes and heat treatments in a sub-stoichiometric atmosphere comprising:
   a main combustion chamber in which a fuel is incompletely combusted so that a fuel gas is produced, said main combustion chamber having an open port;
   a device which is connected to said open port of said main combustion chamber, said device including
      a post-combustion means for combusting the fuel gas from said main combustion chamber, and
      a heat means for storing and exchanging heat with gases passed back and forth therethrough;
   a promoter-feeding means for feeding a combustion promoter (a) to said post-combustion means, and (b) through said heat means to said main combustion chamber;
   an extraction means for extracting the fuel gas into said post-combustion means and then through said heat means; and
   a selection means for alternately connecting said promoter-feeding means and said extraction means to said heat means and for selectively connecting said promoter-feeding means to said post-combustion means whereby said device is alternately operated (a) in a first mode of operation where said extraction means extracts the fuel gas from said main combustion chamber into said post-combustion means where the fuel gas is mixed with the combustion promoter fed to said post-combustion means from said promoter-feeding means to create a hot and completely combusted gas, which completely combusted gas is then passed through said heat means giving up heat to said heat means, and (b) in a second mode of operation where the combustion promoter is fed by said promoter-feeding means through said heat means to pick up heat therefrom and then into said main combustion chamber.

2. A furnace as claimed in claim 1:
   wherein said post-combustion means is a post-combustion chamber having a first opening to which said promoter-feeding means is directly connected and a second opening;
   wherein said heat means is a packing disposed at the second opening of said post-combustion chamber.

3. A furnace as claimed in claim 2:
   wherein said promoter-feeding means includes a conduit connected to the first opening of said post-combustion chamber; and
   wherein said selection means includes a control means disposed in said conduit for closing said conduit during the second mode of operation and for controlling the flow of the combustion promoter into said post-combustion chamber during the first mode of operation.

4. A furnace as claimed in claim 3:
   wherein said packing is an alternating-phase regenerative preheater.

5. A furnace as claimed in claim 3:
   wherein said promoter-feeding means includes a first conduit connected to the second opening of said post-combustion chamber;
   wherein said extraction means includes a second conduit connected to the second opening of said post-combustion chamber; and
   wherein said selection means includes a first valve provided in said first conduit and a second valve provided in said second conduit which are interlocked.

6. A furnace as claimed in claim 2:

wherein said device includes a diffuser element made of a refractory material located in said open port of said main combustion chamber and a conduit which connects said diffuser to a third opening of said post-combustion post-combustion chamber.

7. A furnace as claimed in claim 6:

wherein said first opening and said third opening of said post-combustion chamber are provided along respective sides of said post-combustion chamber such that gases passing therethrough are tangentially introduced relative to the respective sides into said post-combustion chamber.

8. A furnace as claimed in claim 2:

wherein said packing comprises randomly packed spherules or granules of refractory material.

9. A furnace as claimed in claim 2:

wherein said packing comprises perforated stacked refractory bricks.

10. A furnace as claimed in claim 1:

wherein said promoter-feeding means includes a first conduit connected to said heat means;

wherein said extraction means includes a second conduit connected to said heat means; and wherein said selection means includes a first valve provided in said first conduit and a second valve provided in said second conduit which are interlocked.

11. A furnace as claimed in claim 1:

wherein said combustion chamber includes a second open port; and further including a second said device as well as an associated second said promoter-feeding means, second said extraction means, and second said selection means.

12. A furnace as claimed in claim 1:

wherein said combustion chamber includes an even plurality of open ports; and further including an even plurality of said devices as well as a respective even plurality of associated said promoter-feeding means, second said extraction means, and second said selection means.

13. A furnace as claimed in claim 1:

wherein said main combustion chamber is a diffuse combustion type.

* * * * *